(12) United States Patent
Can

(10) Patent No.: US 12,101,439 B2
(45) Date of Patent: *Sep. 24, 2024

(54) SYSTEM AND METHOD FOR IDENTIFYING THEMES IN INTERACTIVE COMMUNICATIONS

(71) Applicant: Capital One Services, LLC, McLean, VA (US)

(72) Inventor: Aysu Ezen Can, Cary, NC (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/382,702

(22) Filed: Oct. 23, 2023

(65) Prior Publication Data

US 2024/0073319 A1 Feb. 29, 2024

Related U.S. Application Data

(63) Continuation of application No. 17/900,595, filed on Aug. 31, 2022, now Pat. No. 11,849,069.

(51) Int. Cl.
| | |
|---|---|
| *H04M 3/523* | (2006.01) |
| *G06F 40/289* | (2020.01) |
| *G06F 40/30* | (2020.01) |
| *G06F 40/284* | (2020.01) |

(52) U.S. Cl.
CPC ........ *H04M 3/5232* (2013.01); *G06F 40/289* (2020.01); *G06F 40/30* (2020.01); *G06F 40/284* (2020.01); *H04M 2203/401* (2013.01); *H04M 2203/408* (2013.01)

(58) Field of Classification Search
CPC ...... G06F 40/284; G06F 40/289; G06F 40/30; H04M 3/51; H04M 3/523; H04M 3/5232; H04M 2203/401
USPC ............ 379/265.07, 265.09, 265.11, 265.12, 379/265.13
See application file for complete search history.

(56) References Cited

U.S. PATENT DOCUMENTS

| | | |
|---|---|---|
| 8,411,841 B2 | 4/2013 | Edwards et al. |
| 9,124,697 B2 | 9/2015 | Scott et al. |
| 9,146,993 B1 | 9/2015 | Chen et al. |
| 9,160,852 B2 | 10/2015 | Ripa et al. |
| 9,225,835 B2 | 12/2015 | Pickford |
| 9,635,181 B1 | 4/2017 | McGann et al. |
| 10,645,224 B2 | 5/2020 | Dwyer et al. |
| 10,714,084 B2 | 7/2020 | Engles et al. |

(Continued)

*Primary Examiner* — Harry S Hong
(74) *Attorney, Agent, or Firm* — Sterne, Kessler, Goldstein & Fox P.L.L.C.

(57) ABSTRACT

Disclosed herein are system, method, and computer program product embodiments for machine learning systems to process incoming call-center calls based on inferred themes. The machine learning system extracts a topic and keywords associated with the topic from a plurality of interactive communications and ranks the keywords based on a frequency of occurrence within the plurality of interactive communications. The machine learning systems select an N highest ranked keywords from the plurality of interactive communications, compares the N highest ranked keywords to previously extracted N highest ranked keywords to identify new keywords, and determines, based on new keywords, that an emerging topic has been articulated in the plurality of interactive communications.

20 Claims, 12 Drawing Sheets

(56) References Cited

U.S. PATENT DOCUMENTS

| | | | |
|---|---|---|---|
| 10,839,322 | B2 | 11/2020 | Pattabhiraman et al. |
| 11,076,047 | B1 | 7/2021 | Clodore et al. |
| 11,501,262 | B1 | 11/2022 | Shetty et al. |
| 11,849,069 | B1 * | 12/2023 | Can .................. G06F 40/30 |
| 2003/0179877 | A1 | 9/2003 | Dezonno et al. |
| 2005/0100159 | A1 | 5/2005 | Fink et al. |
| 2005/0283475 | A1 | 12/2005 | Beranek et al. |
| 2017/0147687 | A1 | 5/2017 | Perun et al. |
| 2019/0012387 | A1 | 1/2019 | Li et al. |
| 2019/0280996 | A1 | 9/2019 | Dahir et al. |
| 2020/0125802 | A1 | 4/2020 | Wigder et al. |
| 2021/0004836 | A1 | 1/2021 | Adibi et al. |
| 2021/0201338 | A1 | 7/2021 | Konig et al. |
| 2022/0164542 | A1 | 5/2022 | Silverstein et al. |

\* cited by examiner

300

Topics at time *t*

| Topic keyword | Importance |
|---|---|
| earthquake | 0.6 |
| app not working | 0.56 |
| chip malfunction | 0.45 |
| interest rates | 0.3 |

302 — Topic keyword
304 — Importance

Topics at time *t+1*

| Topic keyword | Importance |
|---|---|
| COVID | 0.9 |
| pandemic | 0.85 |
| chip malfunction | 0.4 |
| interest rates | 0.2 |

306 — Topic keyword
308 — Importance

FIG. 3

SYSTEM AND METHOD FOR IDENTIFYING THEMES IN INTERACTIVE COMMUNICATIONS

CROSS REFERENCE TO RELATED APPLICATIONS

This application is a continuation of U.S. patent application Ser. No. 17/900,595 titled "System and Method for Identifying Themes in Interactive Communications," filed Aug. 31, 2022, which is herein incorporated by reference in its entirety.

BACKGROUND

Text and speech may be analyzed by computers to discover words and sentences. However, missing in current computer-based text/speech analyzers is an ability to properly recognize themes within an interactive communication of the writer or speaker. For example, text communicated to another person may leave theme discovery to the receiver. However, the receiver may misinterpret an intended theme based on his or her own experiences or current emotional state. As a consequence, they may assign an unintended meaning to the communication.

BRIEF DESCRIPTION OF THE DRAWINGS

The accompanying drawings are incorporated herein and form a part of the specification.

FIG. 3 illustrates a diagram of topic keywords and relative importance, as per some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
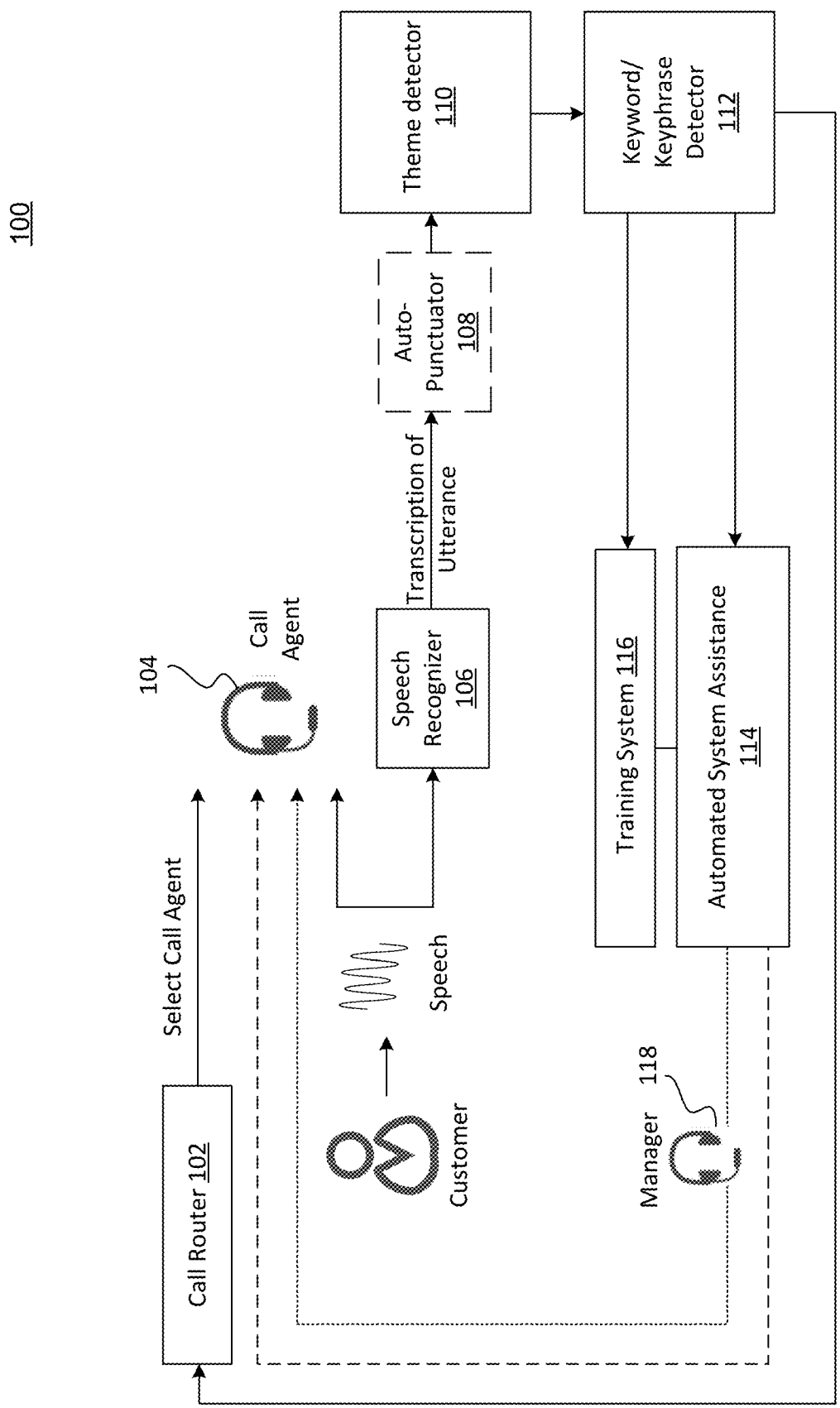
FIG. 1 is a flow diagram for a call center system processing an incoming call, according to some embodiments.

Provided herein are system, apparatus, device, method and/or computer program product embodiments, and/or combinations and sub-combinations thereof to provide real-time support to call center agents to improve customer experience. Customer experience is core to many businesses and a crucial aspect of a positive customer experience may be solving customers' problems in a quick and effective manner. Additionally, there is business value in improving customer experience in terms of both company reputation and customer retention. What is needed is a technical solution to derive user information related to themes from an interactive communication and leverage this information to provide real-time responses to affect the interactive communications.

Customer call centers lie at the heart of the interaction between businesses and their customers. Businesses receive calls every month that involve customer-agent interactions that address customer issues and complaints ranging from a straightforward address-change request to more emotion-laden interactions involving, for example, a hardship-based fee reduction request. Resolving such issues is complex because it requires understanding customers, providing information (in terms of relevance, quantity, and scope), and quickly finding a solution. Call center agents are a precious resource: costly and limited in number. Therefore, it is of the utmost importance to provide them as much assistance as possible during calls so that interactions are fast, resolve the issue, and provide a top-notch customer experience.

Customer call centers are also an important communication front between companies and their customers. It is crucial to establish a good relationship with customers and customer experience lies at the heart of that. Providing a better customer experience is possible by improving the service provided in call centers, resolving customer issues in efficient and effective ways. However, improving call center service is challenging from many aspects. An important factor for this challenge is the fact that topics discussed by customers are changing frequently and agents may first learn about the changed topics during the call, giving them no time to prepare for such a conversation. Throughout the descriptions herein, the terms "topic" and "theme" may be used interchangeably.

In some embodiments, the technology disclosed herein is configured to detect themes as they emerge in customer call centers. The themes are detected as the calls progress in real-time and analysis of the themes may be conducted constantly to gain insights about what customers are talking about and to extract common themes that emerge. Themes can be useful to many different personas from call agents to strategy partners as described in greater detail hereafter.

Topics for which customers are calling customer service call centers are changing constantly making it difficult for agents and business analysts to keep track of the current status. Labeling calls for their topics is a challenging task as there may be hundreds of thousands of calls received in a typical call center every day making it difficult to listen to all of these calls. In some embodiments, the technology disclosed herein is configured with detection methodologies for call centers to detect themes to assist with downstream processing components, such as, real time theme call agent support, routing decisions, training or resource allocations.

In some embodiments, the technology described herein is implemented as a machine learning system to process incoming call-center calls based on inferred themes. The machine learning system extracts keywords associated with an inferred topic or theme from a plurality of interactive communications and ranks the keywords based on a frequency of occurrence within the plurality of interactive communications. For example, the machine learning system selects N highest ranked keywords from a plurality of interactive communications, and compares the N highest ranked keywords to a previously extracted N highest ranked keywords to identify new keywords. The machine learning system subsequently determines, based on the identified new keywords, that an emerging theme (e.g., topic) has been articulated in the plurality of interactive communications. Identified themes or emerging themes may subsequently be used to improve interactions with future callers. In one non-limiting example, phrases associated with an identified theme or emerging theme may be provided to a call agent to use in a dialog with a future caller for the same theme. In one non-limiting example, call agent training on emerging topics may anticipate future caller challenges and questions. In another non-limiting example, future routing decisions may be based on themes or emerging themes detected. In yet another non-limiting example, future call agent resources may be allocated based on detected themes or emerging themes.

Therefore, the technology described herein improves the technology associated with handling calls by, at a minimum, properly capturing caller themes. Properly captured themes, as described herein, is one element leading to higher correlated solutions. As such, the technology described herein improves a computer's inference ability, specifically how a computer identifies a caller themes based at least partially on keywords, thereby improving the operation of the computer system itself.

FIG. 1 illustrates an example call center system 100 processing an incoming interactive communication such as a customer call, as per some embodiments. Call center system 100 can be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 1, as will be understood by a person of ordinary skill in the art.

Call center system 100 shall be described with reference to FIG. 1. However, call center system 100 is not limited to this example embodiment. In addition, call center system 100 will be described at a high level to provide an overall understanding of one example call flow from incoming call to call agent assistance. Greater detail will be provided in the figures that follow.

Call center calls are routed to a call agent 104 through a call router 102. Call router 102 may analyze pre-call information, such as a caller's profile, previous call subjects, previous call interactions, voice menu selections or inputs to automated voice prompts. Call agents may be segmented into groups by subject matter expertise, such as experience with specific subjects (e.g., themes or topics). Understanding which call agent to route the incoming call to may ultimately determine a successful outcome, reduce call time and enhance a customer's experience. In an embodiment, the call agent may be a chatbots(s) or other equivalent communication entity.

Once a call agent 104 is selected, a speech recognizer 106 may analyze the incoming caller's speech in real time by sequentially analyzing utterances. Utterances may include a spoken word, statement, or vocal sound. However, utterances may be difficult to analyze without a proper understanding of how, for example, one utterance relates to another utterance. Languages follow known constructs (e.g., semantics), patterns, rules and structures. Therefore, these utterances may be analyzed using a systematic approach.

One way to increase an understanding of utterances is to aggregate one or more utterances into related structures (segments). Optional auto-punctuator 108 may add punctuation to segments of utterances, thus grouping them into sentences, partial sentences or phrases. For example, the sequential utterances " . . . problem with my credit card . . . " may have two different meanings based on punctuation. In a first scenario, punctuation after the word credit ("problem with my credit. Card . . . ") would indicate a credit issue. In a second scenario, punctuation after the word card ("problem with my credit card") would indicate a credit card issue. Therefore, intelligent punctuation may suggest to the system contextual relevancy needed to properly address caller issues.

Theme Detector 110 subsequently analyzes the text to determine, based on keywords or keyphrases of the call, and the language choice of customer during the call, whether a theme is being voiced. Theme Detector 110 may classify a detected theme based on certain keywords or keyphrases, or frequency of keywords or keyphrases. For example, a caller may introduce subject specific subject matter wording or phrasing. In a non-limiting example, common keywords or keyphrases typically associated with a lost credit card may be detected. In another non-limiting example, new keywords or phrasing around a new subject (e.g., "COVID") may indicate a new emerging theme. Therefore, the technology described herein improves the technology associated with handling calls by, at a minimum, properly capturing call themes and providing corresponding call solutions. Properly captured themes, as described herein, is one element leading to higher correlated solutions.

For detected themes, keyword/keyphrases detector 112 ranks N keywords from a corresponding interactive communication and compares them against N keywords/keyphrases extracted from previously identified themes. Keywords may be recognized by semantic use, frequency of use, emphasis or be at least partially based on a pre-stored set of known keywords. A solution set may also be generated by comparing these N keywords/keyphrases against extracted N keywords/keyphrases for similar customers with similar issues and successful resolutions of previous theme related interactions. Automated system assistance 114 subsequently analyzes these successful resolutions to determine which actions may have contextually contributed (e.g., based on relevance) to the success. In some embodiments, actions that are considered relevant to the success are selected and communicated to call agent 104. For example, call agent 104 may receive a list of actions displayed on their computer screen. Phrases may include, or be combined with, additional contextual information, such as product descriptions, product suggestions, customer options or steps that may provide technical assistance.

For detected emerging themes, where successful resolutions may not yet exist or be as plentiful, a manager alert may be triggered to provide experienced managerial level assistance (manager 118) in real time. This real time assistance is provided to a call agent communicating in a current dialog that contains the emerging theme. Alternatively, or in addition, the training system 116 becomes aware of the emerging themes, associated with keywords/keyphrases, and monitors trends for this emerging theme to understand training needs and or future resource allocation.

Figure 2:
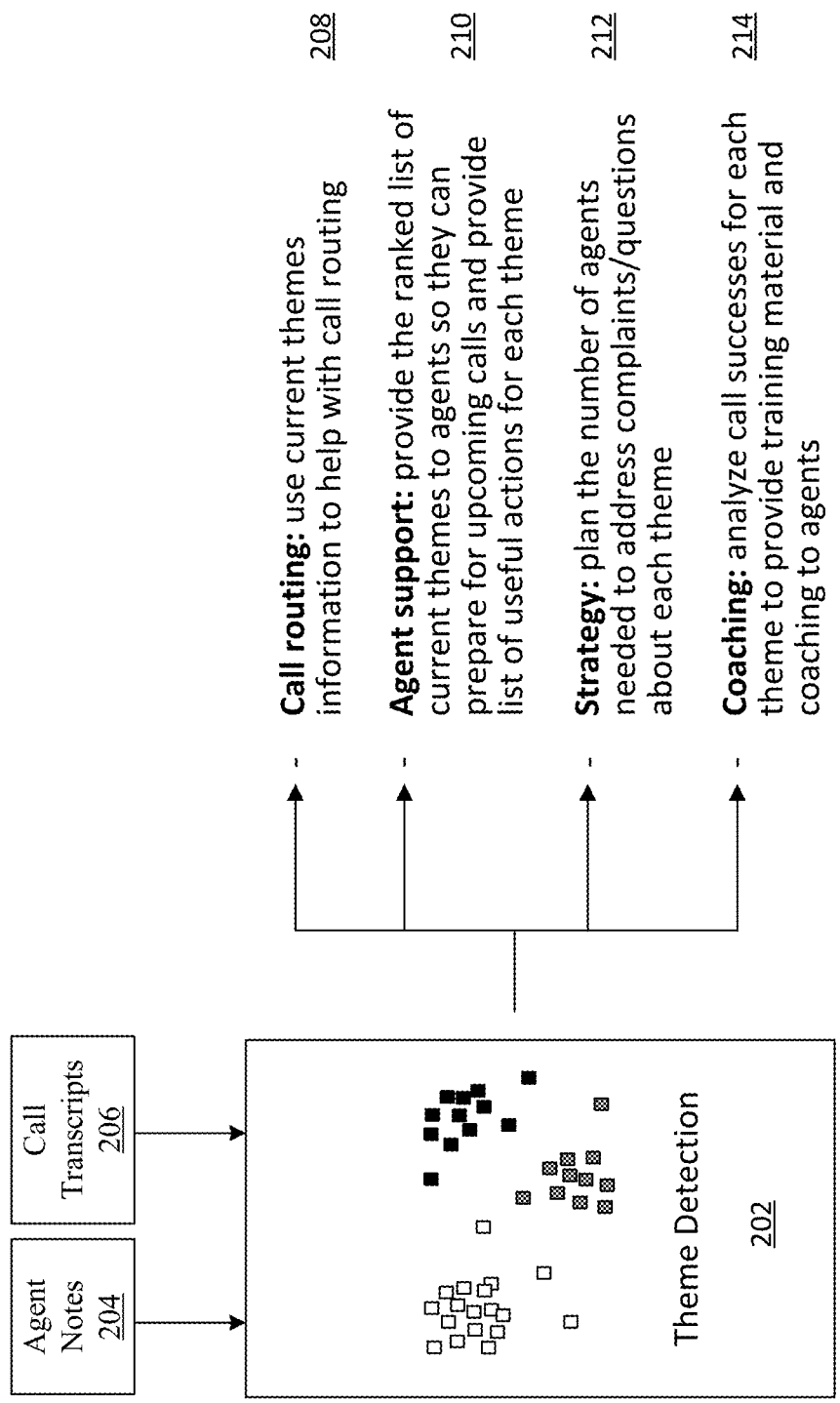
FIG. 2 illustrates a theme detection and example applications, as per some embodiments.

FIG. 2 illustrates a system for theme detection, as per some embodiments. System 200 described may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the call center system 100 or installed as a removable portion of the call center system 100.

In an embodiment, there are two example primary sources of information that may be used for detecting themes 202 in call centers: agent notes 204 and call transcripts 206. Agents may add a note to each call summarizing what the call was about. "The customer wanted a replacement card" is an example agent note. This field may be free form text and may be used for at least partially detecting themes. Incoming calls to the customer call center 100 may be automatically transcribed into transcripts 206 (i.e., text) using Speech Recognizer 106 and the transcripts made available automatically. These transcriptions contain interactions that have happened so far for a current call and may also be a source of information to be mined in terms of detecting themes or emerging themes. In a non-limiting example, a theme that can be found from the above described note may be "replacement cards", which may be associated with a further indication of some sort of chip malfunction in recent cards. This secondary type of related information (e.g., chip malfunction) may be deduced by analyzing related themes with one or more common keywords. These two resources of data will be used for the theme detection approaches explained in greater detail hereafter.

Theme detection results may be implemented in various use cases. For example, as shown in 208, call routing is an important task in call centers as the number of agents in the call centers are limited and it may be beneficial for all customer problems to be resolved in an efficient manner. Therefore, call routing becomes an optimization problem. Theme-based routing may provide a corresponding call agent who is properly training on the recognized theme.

In another example, as shown in 210, agent support may be enhanced with theme knowledge. For example, knowing trends and themes in a customer service center allows agents to have an idea about what topics will likely be covered in upcoming calls. This may be beneficial for agents to prepare for their calls ahead of time and will result in a better customer experience. In one embodiment, calls are summarized by current themes and provided to each agent along with similar customers and actions that helped them. This process may help agents choose from successful actions that were useful to similar customers for a given topic and increase the overall satisfaction.

In another example, as shown in 212, once the themes that are most talked about are known, as well as the number of calls for each theme, that information may be used to determine how many agents are needed to cover each topic and call routing can then help route customers to the call agents for each topic. For themes that have a lot of calls coming in, more agents can be allocated, whereas for themes that are not very prominent, fewer agents should be sufficient.

In another example, as shown in 214, coaching is an integral part of providing the best experience to customers when they call the customer service centers. Coaching entails equipping call agents with the best tools, most useful knowledge and actions that can be taken in different situations. Coaching all agents for all themes or topics would be ideal; however, this is not practically feasible. Therefore, coaching opportunities can be propagated from an aggregated view for each theme or from an individual agent perspective.

FIG. 3 illustrates a diagram of example topic keywords and relative importance, as per some embodiments. Topics shown in diagram 300 may be determined by instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the call center system 100 or installed as a removable portion of the call center system 100.

In some embodiments, theme detection may be implemented in real time. For example, in a first theme detection task, topic modeling may be run continuously. At any given time, the topic keywords 306 will be compared against keywords 302 from a previous time period, for example, the previous week (or the previous month depending on the desired time difference). The keywords that are new will be highlighted and ranked in terms of frequency showing how much each new topic is gaining attention. For example, the topic keywords 302 or 306 may be ranked by respective importance 304 or 308, which may in part be attributable, but not limited to, frequency.

In the example shown in FIG. 3, it can be seen that the topic keywords 306 "COVID" and "pandemic" emerged from time t to time t+1. Therefore, these are new or emerging themes that will be processed to downstream systems and users (information for further business decisions). For topic modeling, in some embodiments, the system uses a Latent Dirichlet Allocation (LDA) technique to compare different topic keywords over time. The LDA algorithm outputs a list of topics and top keywords for each topic within the input documents (in this case, the call transcripts and agent notes). In some embodiments, the machine learning engine 702 (FIG. 7) ranks those keywords based on importance and compares them over time to see which new topics are being discussed in the incoming calls.

Figure 4:
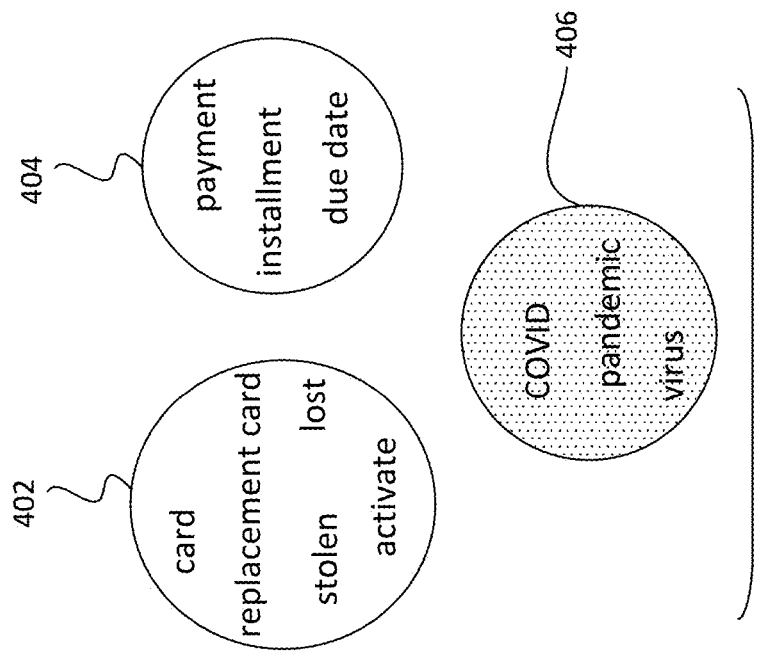
FIG. 4 illustrates a theme detection by clustering and emerging topic discovery, as per some embodiments.
Figure 4:
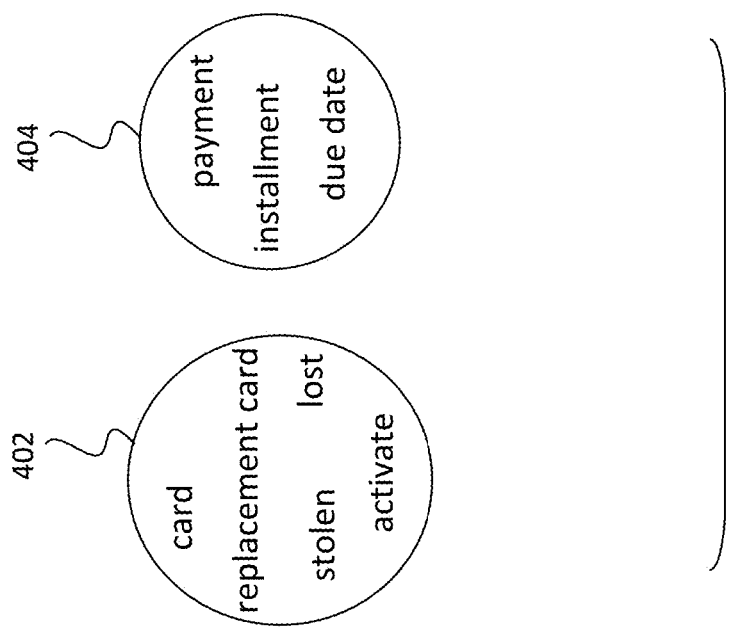

FIG. 4 illustrates a diagram of clustering of topic keywords, as per some embodiments. The clustering functionality shown in diagram 400 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the call center system 100 or installed as a removable portion of the call center system 100.

As shown, in some embodiments, theme detection may be implemented with clustering. Clusters 402 and 404 are detected at time t. For example, a first cluster 402 may be focused on replacement cards and a second cluster 404 focused on installment payments. These clusters may represent prominent call topics or themes at time t. These themes may be detected as previously described by analyzing call-related text (e.g., agent notes and call transcripts) to cluster interactions based on similarity. Newly obtained clusters may be compared against existing clusters from a previous time frame (e.g., week/month) to understand if there are changes in the themes. New clusters will indicate new or emerging themes and disappearing clusters will indicate themes that are not active anymore. As shown, different time frames may generate different clusters. At time t+1, clusters 402 and 404 are still prevalent. However, also at time t+1, a new cluster 406 directed to a COVID topic emerges. In some embodiments, each cluster may be analyzed to extract most-frequently used phrases to summarize key phrases in each theme. In this example, key phrases "COVID", "pandemic" and "virus" are extracted by identifying the most frequent content words in the input data and summarizing them in the cluster visualization 406 to make an easy-to-understand theme view.

Figure 5:
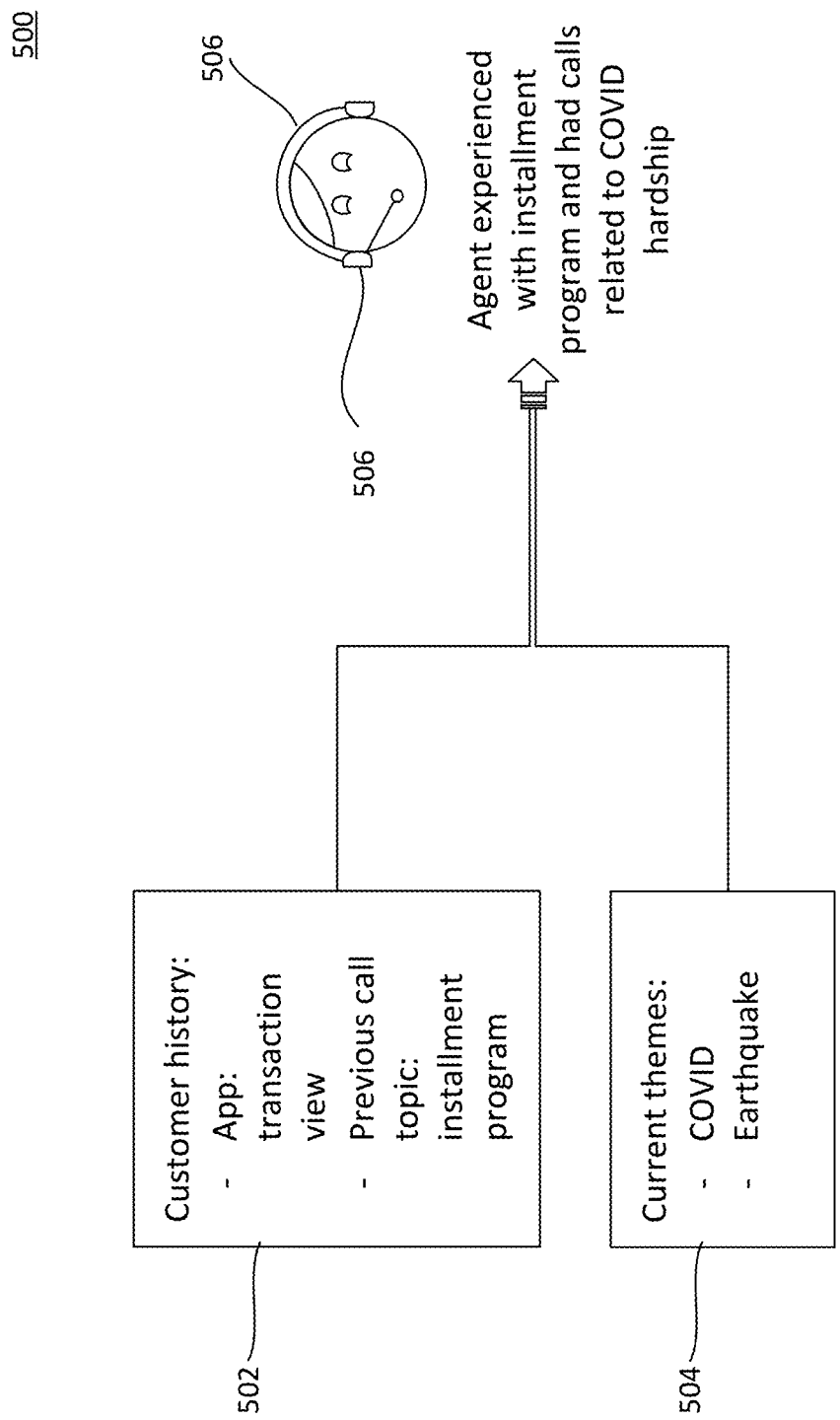
FIG. 5 illustrates a call agent assignment based on theme detection, as per some embodiments.

FIG. 5 illustrates a call agent assignment based on theme detection, as per some embodiments. The flow diagram 500 described may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the call center system 100 or installed as a removable portion of the call center system 100.

As shown, in some embodiments, call agent assignment may be implemented utilizing detected themes. Call routing is an important task in call centers as the number of agents in the call centers are limited and the call center would prefer all customer problems to be resolved in an efficient manner. Therefore, call routing becomes an optimization problem. In some embodiments, the extracted themes are utilized to match a customer needs with appropriate call agents. In order to maximize the information for more accurate call routing, the system may use the customer history along with the current themes to select a most suitable agent.

As shown, a call routing is needed where, according to a customer history 502, a customer has been using the transaction view in the application most recently and in his previous call to the customer service center, he asked about the installment program. Having that information along with the fact that the most prominent theme 504 at the time is COVID, the call routing system predicts that the customer is likely calling about learning more about COVID hardship and any changes to the installment program as it related to COVID. Therefore, using the techniques described herein, the call routing system matches the call to a call agent 506 that has experience in those fields.

Figure 6:
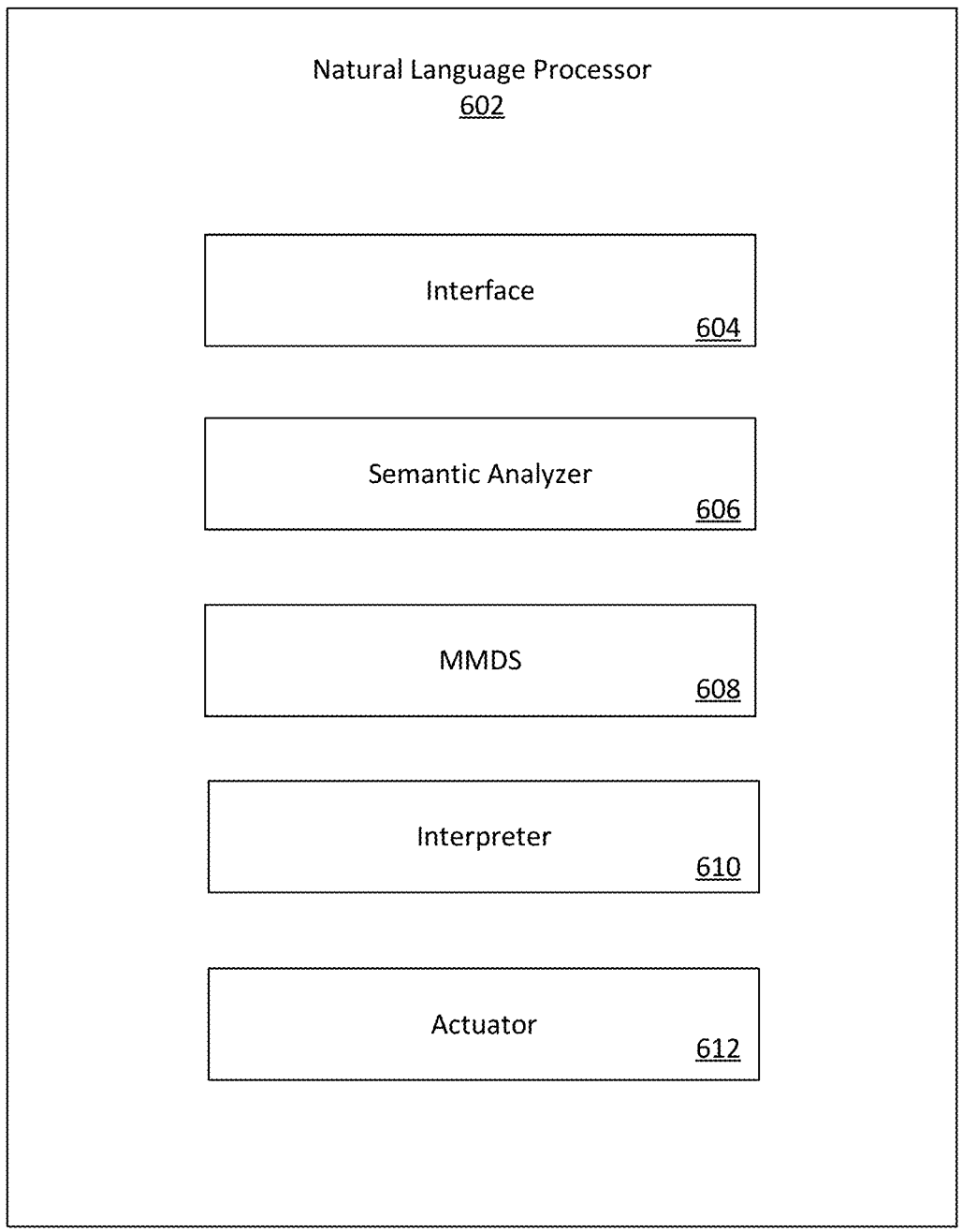
FIG. 6 is a block diagram for natural language processing of an incoming call, according to some embodiments.

FIG. 6 is a block diagram of a Natural Language Processor (NLP) system 600, according to some embodiments. The number of components in system 600 is not limited to what is shown and other variations in the number of arrangements of components are possible, consistent with some embodiments disclosed herein. The components of FIG. 6 may be implemented through hardware, software, and/or firmware. As used herein, the term non-recurrent neural networks, which includes transformer networks, refers to machine learning processes and neural network architectures designed to handle ordered sequences of data for various natural language processing (NLP) tasks. NLP tasks may include, for example, text translation, text summarization, text generation, word, phrase or sentence analysis and completion, determination of punctuation, or similar NLP tasks performed by computers.

As illustrated, system 600 may comprise a Natural Language Processor (NLP) 602. NLP 602 may include any device, mechanism, system, network, and/or compilation of instructions for performing natural language recognition of caller themes, consistent with the technology described herein. In the configuration illustrated in FIG. 6, NLP 602 may include an interface 604, a semantic analyzer 606, a Master and Metadata Searcher (MMDS) 608, an interpreter 610, and/or an actuator 612. In certain embodiments, components 604, 606, 608, 610, and/or 612 may each be implemented via any combination of hardware, software, and/or firmware.

Interface 604 may serve as an entry point or user interface through which one or more utterances, such as spoken words/sentences (speech), may be entered for subsequent recognition using an automatic speech recognition model. While described for spoken words throughout the application, text may also be analyzed and processed using the technology described herein. For example, a pop-up chat session may be substituted for spoken words. In another embodiment, text from emails may be substituted for spoken words. In yet another embodiment, spoken words converted to text or text converted to spoken words, such as for blind or deaf callers, may be substituted without departing from the scope of the technology described herein.

In certain embodiments, interface 604 may facilitate information exchange among and between NLP 602 and one or more users (callers) and/or systems. Interface 604 may be implemented by one or more software, hardware, and/or firmware components. Interface 604 may include one or more logical components, processes, algorithms, systems, applications, and/or networks. Certain functions embodied by interface 604 may be implemented by, for example, HTML, HTML with JavaScript, C/C++, Java, etc. Interface 604 may include or be coupled to one or more data ports for transmitting and receiving data from one or more components coupled to NLP 602. Interface 604 may include or be coupled to one or more user interfaces (e.g., a speaker, microphone, headset, or GUI).

In certain configurations, interface 604 may interact with one or more applications running on one or more computer systems. Interface 604 may, for example, embed functionality associated with components of NLP 602 into applications running on a computer system. In one example, interface 604 may embed NLP 602 functionality into a Web browser or interactive menu application with which a user (call agent) interacts. For instance, interface 604 may embed GUI elements (e.g., dialog boxes, input fields, textual messages, etc.) associated with NLP 602 functionality in an application with which a user interacts. Details of applications with which interface 604 may interact are discussed in connection with FIGS. 1-11.

In certain embodiments, interface 604 may include, be coupled to, and/or integrate one or more systems and/or applications, such as speech recognition facilities and Text-To-Speech (TTS) engines. Further, interface 604 may serve as an entry point to one or more voice portals. Such a voice portal may include software and hardware for receiving and processing instructions from a user via voice. The voice portal may include, for example, a voice recognition function and an associated application server. The voice recognition function may receive and interpret dictation, or recognize spoken commands. The application server may take, for example, the output from the voice recognition function, convert it to a format suitable for other systems, and forward the information to those systems.

Consistent with embodiments of the present invention, interface 604 may receive natural language queries (e.g., word, phrases or sentences) from a caller and forward the queries to semantic analyzer 606.

Semantic analyzer 606 may transform natural language queries into semantic tokens. Semantic tokens may include additional information, such as language identifiers, to help provide context or resolve meaning. Semantic analyzer 606 may be implemented by one or more software, hardware, and/or firmware components. Semantic analyzer 606 may include one or more logical components, processes, algorithms, systems, applications, and/or networks. Semantic analyzer 606 may include stemming logic, combinatorial intelligence, and/or logic for combining different tokenizers for different languages. In one configuration, semantic analyzer 606 may receive an ASCII string and output a list of words. Semantic analyzer 606 may transmit generated tokens to MMDS 608 via standard machine-readable formats, such as the eXtensible Markup Language (XML).

MMDS 608 may be configured to retrieve information using tokens received from semantic analyzer 606. MMDS 608 may be implemented by one or more software, hardware, and/or firmware components. MMDS 608 may include one or more logical components, processes, algorithms, systems, applications, and/or networks. In one configuration, MMDS 608 may include an API, a searching framework, one or more applications, and one or more search engines.

MMDS 608 may include an API, which facilitates requests to one or more operating systems and/or applications included in or coupled to MMDS 608. For example, the API may facilitate interaction between MMDS and one or more structured data archives (e.g., knowledge base).

In certain embodiments, MMDS 608 may be configured to maintain a searchable data index, including metadata, master data, metadata descriptions, and/or system element descriptions. For example, the data index may include readable field names (e.g., textual) for metadata (e.g., table names and column headers), master data (e.g., individual field values), and metadata descriptions. The data index may be implemented via one or more hardware, software, and/or firmware components. In one implementation, a searching framework within MMDS 608 may initialize the data index, perform delta indexing, collect metadata, collect master data, and administer indexing. Such a searching framework may be included in one or more business intelligence applications (e.g., helpdesk, chatbots, voice interactive modules, etc.)

In certain configurations, MMDS 608 may include or be coupled to a low level semantic analyzer, which may be embodied by one or more software, hardware, and/or firmware components. The semantic analyzer may include components for receiving tokens from semantic analyzer 606 and identifying relevant synonyms, hypernyms, etc. In one embodiment, the semantic analyzer may include and/or be coupled to a table of synonyms, hypernyms, etc. The semantic analyzer may include components for adding such synonyms as supplements to the tokens.

Consistent with embodiments of the present invention, MMDS 608 may leverage various components and searching techniques/algorithms to search the data index using tokens received by semantic analyzer 606. MMDS 608 may leverage one or more search engines that employ partial/fuzzy matching processes and/or one or more Boolean, federated, or attribute searching components. By way of non-limiting examples, similar customers, similar calls (e.g., similar complaints) or positive/negative call outcomes may be discovered using the various described searching components. Although, one skilled in the art will appreciate other approaches to identify these similar elements may be used or contemplated within the scope of the technology described herein.

In certain configurations, MMDS 608 may include and/or leverage one or more information validation processes. In one configuration, MMDS 608 may leverage one or more languages for validating XML, information. MMDS 608 may include or be coupled to one or more clients that include business application subsystems.

In certain configurations, MMDS 608 may include one or more software, hardware, and/or firmware components for prioritizing information found in the data index with respect to the semantic tokens. In one example, such components may generate match scores, which represent a qualitative and/or quantitative weight or bias indicating the strength/correlation of the association between elements in the data index and the semantic tokens.

Figure 7:
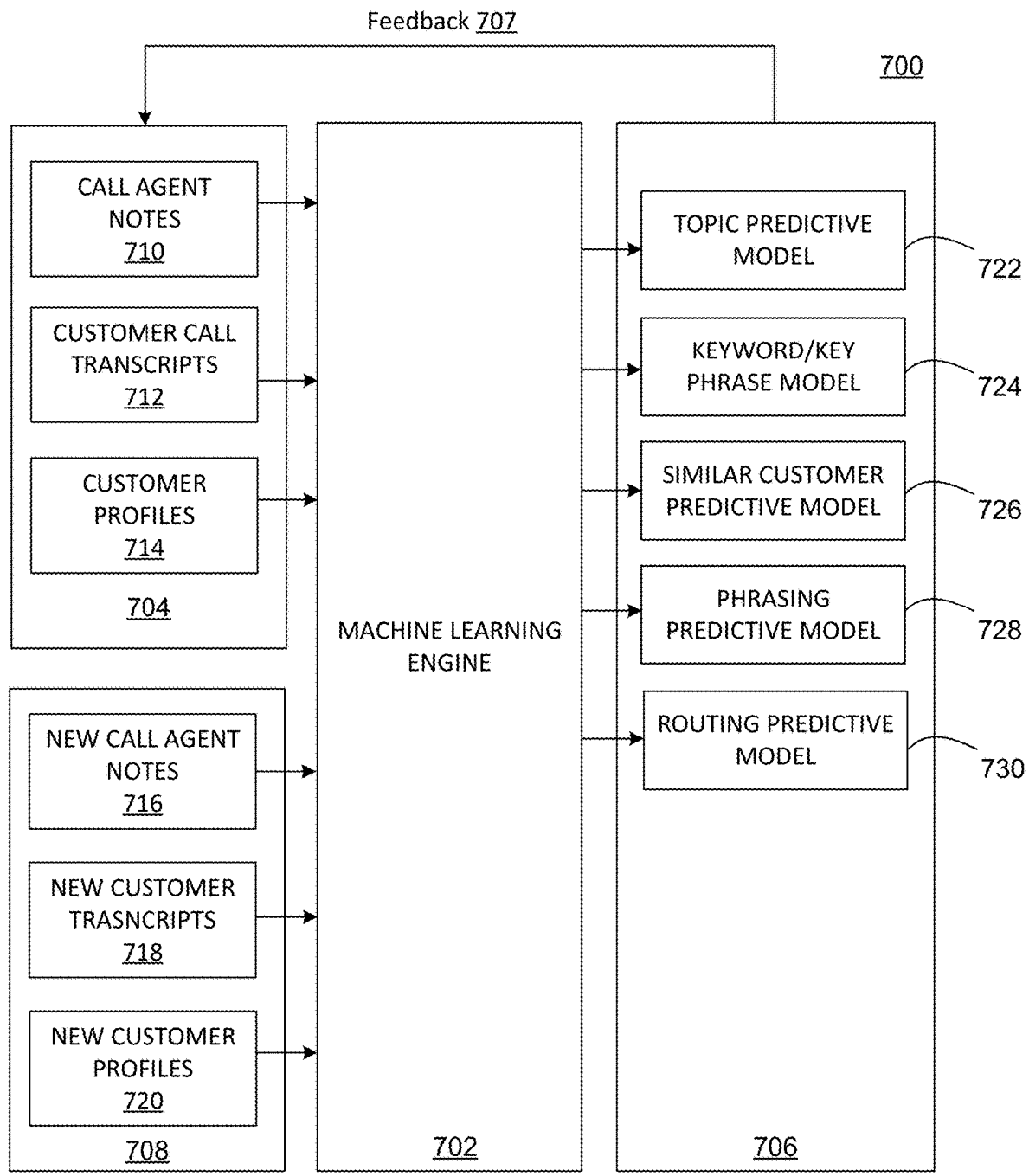
FIG. 7 is a block diagram for processing an incoming call with machine learning, according to some embodiments.

In one configuration, MMDS 608 may include one or more machine learning components as discussed further in association with FIG. 7. In one example, such a learning component may observe and/or log information requested by callers and may build additional and/or prioritized indexes for fast access to frequently requested data. Learning components may exclude frequently requested information from the data index, and such MMDS data may be forwarded to and/or included in interpreter 610.

MMDS 608 may output to interpreter 610 a series of meta and/or master data technical addresses, associated field names, and any associated description fields. MMDS 608 may also output matching scores to interpreter 610.

Interpreter 610 may process and analyze results returned by MMDS 608. Interpreter 610 may be implemented by one or more software, hardware, and/or firmware components. Interpreter 610 may include one or more logical components, processes, algorithms, systems, applications, and/or networks. In one example, interpreter 610 may include an agent network, in which agents make claims by matching policy conditions against tokenized natural language queries and context information.

Consistent with embodiments of the present invention, interpreter 610 may be configured to recognize information identified by MMDS 608. For example, interpreter 610 may identify ambiguities, input deficiencies, imperfect conceptual matches, and compound commands. In certain configurations, interpreter 610 may initiate, configure, and manage user dialogs; specify and manage configurable policies; perform context awareness processes; maintain context information; personalize policies and perform context switches; and perform learning processes.

Interpreter 610 may provide one or more winning combinations of data elements to actuator 612. Interpreter 610 may filter information identified by MMDS 608 in order to extract information that is actually relevant to spoken inputs. That is, interpreter 610 may distill information identified by MMDS 608 down to information that is relevant to the words/sentences and in accordance with intent. Information provided by interpreter 610 (i.e., winning combination of elements) may include function calls, metadata, and/or master data. In certain embodiments, the winning combination of elements may be arranged in specific sequence to ensure proper actuation. Further, appropriate relationships and dependencies among and between various elements of the winning combinations may be preserved/maintained. For example, meta and master data elements included in a winning combination may be used to populate one or more function calls included in that winning combination.

Actuator 612 may process interpreted information provided by interpreter 610. Actuator 612 may be implemented by one or more software, hardware, and/or firmware components. Actuator 612 may include one or more logical components, processes, algorithms, systems, applications, and/or networks. Actuator 612 may be configurable to interact with one or more system environments.

Consistent with embodiments of the present invention, actuator 612 may be configured to provide information to one or more users/systems (e.g., theme detector). In such embodiments, actuator 612 may interact with one or more information display devices.

In certain embodiments, actuator 612 may be configured to send requests to one or more devices and/or systems using, for example, various APIs. Actuator 612 may generate one or more presentations based on responses to such commands.

For clarity of explanation, interface 604, semantic analyzer 606, MMDS 608, interpreter 610, and actuator 612 are described as discrete functional elements within NLP 602. However, it should be understood that the functionality of these elements may overlap and/or may exist in fewer elements and components. Moreover, all or part of the functionality of these elements may co-exist or be distributed among several geographically-dispersed locations.

FIG. 7 is a block diagram of a machine learning system, according to some embodiments. A machine learning system 700 may include a machine learning engine 702 of one or more servers (cloud or local) processing audio text (speech), such as words, phrases or sentences, to recognize relationships of words (e.g., within sentences) received by natural language system 600. As described in various embodiments, machine learning engine 702 may be used to recognize topics/themes within a customer's speech, recognize keywords and key phrases within the detected theme, determine similar customers, provide relevant phrasing to provide real-time assistance to a call agent and route incoming calls based on a detected theme. While described in stages, the sequence may include more or less stages or be performed in a different order. For purposes of discussion, the term "topic" will be used hereafter. However, the term "theme" may be substituted without departing from the scope of the technology described herein.

The machine learning system 700 gathers topics that customers are talking about during their calls to the customer service call centers and utilizes the extracted information to aid in different business decisions and goals related to improving customer experience. In some embodiments, the machine learning system 700 implements various different techniques for topic detection and may include a variety of use cases of how the extracted topics may be used. FIG. 2 summarizes a proposed framework.

Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input.

Unsupervised learning can be a goal in itself (discovering hidden patterns in data) or a means towards an end (feature learning). Machine learning engine 702 may use various classifiers to map concepts associated with a specific language structure to capture relationships between concepts and words/phrases/sentences. The classifier (discriminator) is trained to distinguish (recognize) variations. Different variations may be classified to ensure no collapse of the classifier and so that variations can be distinguished.

Machine learning may involve computers learning from data provided so that they carry out certain tasks. For more advanced tasks, it can be challenging for a human to manually create the needed algorithms. This may be especially true of teaching approaches to correctly identify speech patterns and associated emotions within varying speech structures. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of word recognition, a dataset of audio/word matches may be used.

In a first stage, training data set 704 (e.g., agent notes 710, customer call transcripts 712, customer profiles 714, etc.) may be ingested to train various predictive models 706. The customer profiles 714 may contain both metadata related to the customer, collected in an offline manner, as well as information collected by the various ML models 706, which may be iteratively updated as a call proceeds. A customer profile may contain a mix of data types. For example, all data types are vectorized and then concatenated to form a single fixed-length vector.

In a first case example, a topic predictive model 722 may be trained based on machine learning engine 702 processing training data set 704. Training a model means learning (determining) values for weights as well as inherent bias from labeled examples. In supervised learning, a machine learning algorithm builds a model by examining many examples and attempting to find a model that minimizes loss; this process is called empirical risk minimization. A language model assigns a probability of a next word in a sequence of words. A conditional language model is a generalization of this idea: it assigns probabilities to a sequence of words given some conditioning context. In some embodiments, a Latent Dirichlet Allocation (LDA) model is a generative statistical model that allows sets of observations to be explained by unobserved groups that explain why some parts of the data are similar. For example, if observations are words collected into customer dialogs (e.g., transcripts), it posits that each dialog is a mixture of a small number of topics and that each word's presence is attributable to one of the dialogs' topics. LDA is one example of a topic model and belongs to the machine learning field and in a wider sense to the artificial intelligence field. In some embodiments, a clustering algorithm is implemented to detect topics. For example, topics are predicted by a clustering of keywords or key phrases in a specific call transcript instance or in an aggregated number of call transcript instances. In some embodiments, the LDA or clustering predictive models may be trained to recognize topics over time to capture new or emerging topics, or to recognize diminished or disappearing topics.

In a second stage, the training cycle continuously looks at results, measures accuracy and fine-tunes the inputs to the modeling engine (feedback loop 707) to improve capabilities of the various predictive models 706.

In addition, as various predictive models (algorithms) 706 are created, they are stored in a database (not shown). For example, as the training sets are processed through the machine learning engine 702, the topic predictive model 722 may change (tuning/fine tuning) and therefore may be recorded in the database.

Future new data 708 (e.g., new call agent notes 716, new customer call transcripts 718, and customer profiles 720) may be subsequently evaluated with the trained predictive models 706 to recognize topics in the new data.

The system may track topic trends over time and determine the part of the call in which the topic occurred. As the call is happening (i.e., in real time), a topic may be detected on the current utterance. Subsequent utterances may also be labeled as topics. As the call continues, utterances may begin to have higher topic score correlation compared to previous utterances and thus be labeled as a topic, for example, a score reaches a threshold of certainty (e.g., greater than 0.5) of being a specific topic.

Keyword/Key Phrase Model 724 may be a text classifier to evaluate an interactive communication between a first participant and a second participant to obtain one or more key words or phrases in the speech of the first participant. In the description below, the term "keyword" may be interchangeable with the phrase "key phrase" and may be substituted without departing from the scope of the technology described herein.

Keywords may indicate the topic(s) within a dialogue. In addition, they may be semantically rich and easy to comprehend as they may typically be short (e.g., 1-2 word phrases). These short phrases may be useful for determining the intent of calls automatically. The one or more key phrases of the speech may be based at least partially on linguistic cues within the interactive communication.

In some embodiments, Keyword/Key Phrase Model 724 utilizes a term frequency-inverse document frequency (tf-idf) approach to look at the frequencies of words or phrases on a given call. In information retrieval, tf-idf is a numerical statistic that is intended to reflect how important a word or phrase is to a document in a collection or corpus. It is often used as a weighting factor in searches of information retrieval, text mining, and user modeling. The tf-idf value increases proportionally to the number of times a word or phrase appears in the document and is offset by the number of documents in the corpus that contains the word or phrase, which helps to adjust for the fact that some words or phrases appear more frequently in general. Tf-idf can be successfully used for stop-words filtering in various subject fields, including text summarization and classification. For example, if a certain phrase is rare in most of the other calls, but more frequent in the current call, then it is selected as a key phrase for this call.

In some embodiments, the keywords or phrases are extracted in an unsupervised manner and therefore do not become outdated, as they may be updated as new calls come in. Therefore, even when word choices differ through time, the keyword/phrase model (e.g., extractor) is able to keep up with the new trends (e.g., new phrasing or new subjects). In one non-limiting example, keyword or phrase extraction may be unsupervised and may utilize any known key phrase extraction technique, such as BERT based techniques.

In similar customer predictive model 726, a new training set (not shown) may include a large set of N previous user interactions (e.g., call data, customer speech and customer profiles). Machine learning engine 702 processes this training set to recognize call agent interactions with similar customers that previously resulted in successful outcomes based on specific call agent phrasing and associated subsequent actions/options selected. Once the similar customer predictive model 726 has been trained to recognize patterns of behavior that resulted in successful behavior, it may take as an input any future behavior and correlate to determine a higher likelihood of successful outcome.

In some embodiments, the similar customer predictive model 726 may provide as a training input real-time similar phrasing/actions/options to be classified by phrasing predictive model 728 as suggestions to assist call agents while they are in a current call session. Phrasing model 728 may, in one non-limiting example embodiment, use a deep learning approach to auto-generate text called seq2seq ("sequence to sequence") using as training data segments of transcripts in which a customer problem has been identified and includes corresponding agent responses to the articulated problem. Seq2seq models are trained on input/output pairs of sequences. In this specific example, the input sequence is the problem statement ("Your late-payment fees are exorbitant", etc.) and the output sequence is the agent's articulated response to the problem statement ("I understand your frustration with our late payment process", etc.). A seq2seq model may be trained on several hundred thousand such problem statement/agent response pairs, culled from past interactions. Seq2seq may be used for any task that involves learning to produce a sequence of tokens given some input sequence of tokens. For example, a machine translation task where an input is French sentences and an output is English sentences. In another example, the training data may include question/answer pairs for conversational AI (e.g., input is question and output is answer).

In routing predictive model 730, the routing predictive model is trained using previous call routing instances, previously detected themes and customer profiles. The routing predictive model is trained to recognize previous customers, their previous topics, similar customer topics, prolific or emerging topics to infer (predict) a relevant call agent (or call agent group tasked with working with a specific topic (e.g., credit card issues)). An incoming call is subsequently routed to call agents trained in this topic.

The system is a framework that unites several components to better understand customers and help call center agents converse with customers to achieve higher customer satisfaction. The system detects when customers become or are soon to be frustrated and provides support to agents in real time to improve the customer experience.

Figure 8:
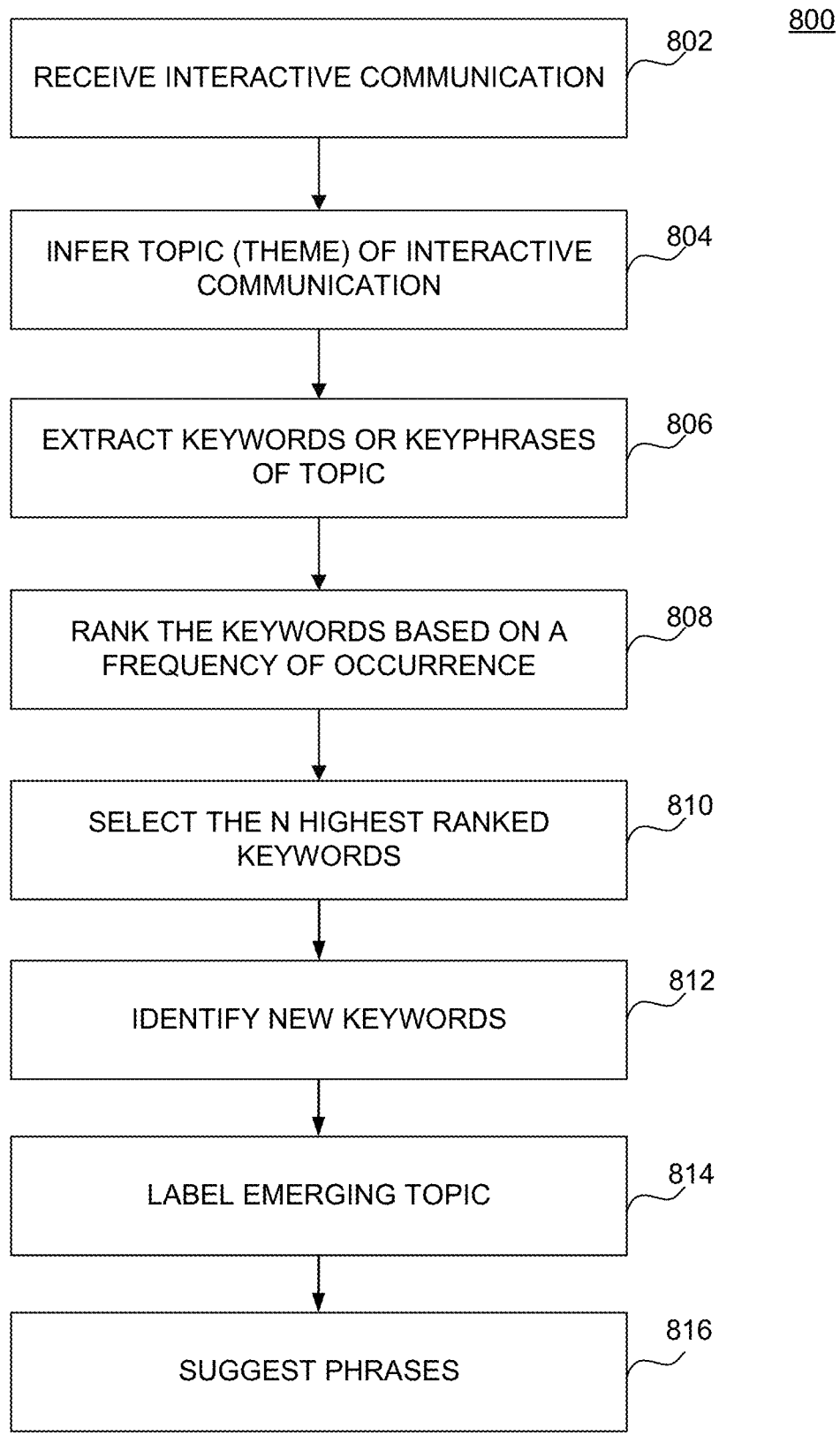
FIG. 8 is a flow diagram for real-time theme detection and assistance, according to some embodiments.

FIG. 8 is a flow diagram of a method 800 for real-time call processing, according to some embodiments.

In 802, call center system 100 receives and forwards incoming calls to a call agent based on inferred intelligence. Call routing may be based on an analysis of pre-call information, such as a caller's profile, previous call interactions, voice menu selections or inputs to automated voice prompts.

In 804, call center system 100 may infer/classify the incoming call to extract one or more topics found within the incoming call. A machine learning engine 302 trains a topic predictive model 324 to detect both existing as well as emerging topics. The system performs aspect-based topic classification on a turn level (i.e., every time a new utterance is available) as well as over a plurality of incoming calls. Performing this classification in real-time enables the system to track how topics change over the course of a call, a day, a week, a month, etc.

In 806, call center system 100 may extract call keywords or key phrases from the detected topic. For example, Keyword/Key Phrase Model 724 may be a text classifier to evaluate an interactive communication between a first participant and a second participant to obtain one or more key words or phrases in the speech of the first participant. The term "keyword" may be interchangeable with the phrase "key phrase" and may be substituted without departing from the scope of the technology described herein.

In 808, call center system 100 ranks N keywords from a corresponding interactive communication (call). N Keywords may be recognized by semantic use, frequency of use, emphasis or be at least partially based on a pre-stored set of known keywords.

In 810, call center system 100 selects the N highest ranked keywords and compares, in 812, these keywords against N keywords extracted from previously identified topics to identify new keywords. For example, each time N keywords are extracted, they may be stored in a computer database (locally or remotely) and may be subsequently retrieved for future comparisons over time. Keywords may be recognized by semantic use, frequency of use, emphasis or be at least partially based on a pre-stored set of known keywords. In addition, a solution set may also be generated by comparing these N keywords against extracted N keywords for similar customers with similar issues and successful resolutions of previous theme related interactions.

In 814, based on the new keywords, new emerging topics identified and labeled. For example, using Latent Dirichlet Allocation (LDA) or clustering models, the system will label the new keywords as being an indicator (e.g., cluster) of an emerging topic.

In 816, call center system 100 may determine phrases to suggest. For example, if a topic score exceeds a predetermined threshold, an automated agent assistance component 114 may be triggered to assist the agent in handling the topic (e.g., if untrained in this topic). For detected topics, the system will search for similar customers with similar issues and successful resolutions of previous complaints. Automated system assistance module 114 will subsequently analyze these successful resolutions to determine which actions may have contextually contributed (e.g., based on relevance) to the success and may suggest keywords or phrases that are considered relevant to previous successful outcomes of similar callers to be selected and communicated to call agent 104. For example, call agent will have the topic and associated phrases rendered on their computer screen. Phrases may include, or be combined with, the keywords or key phrases, additional contextual information, such as product descriptions, product suggestions, and customer options or steps that may provide technical assistance. In some embodiments, the topics labeled as emerging may be rendered in a graphical user interface (GUI) and provided to various components of the call center, such as, but not limited to, manager displays, call agent displays, training systems, etc.

In addition, once emerging topics have been identified, a routing predictive model 730 may recognize previous customers in future incoming calls, their previous topics, similar customer topics, prolific or emerging topics to infer (predict) a relevant call agent (or call agent group tasked with working with a specific topic (e.g., credit card issues)). An incoming call may subsequently be routed to call agents trained in this topic.

Figure 9:
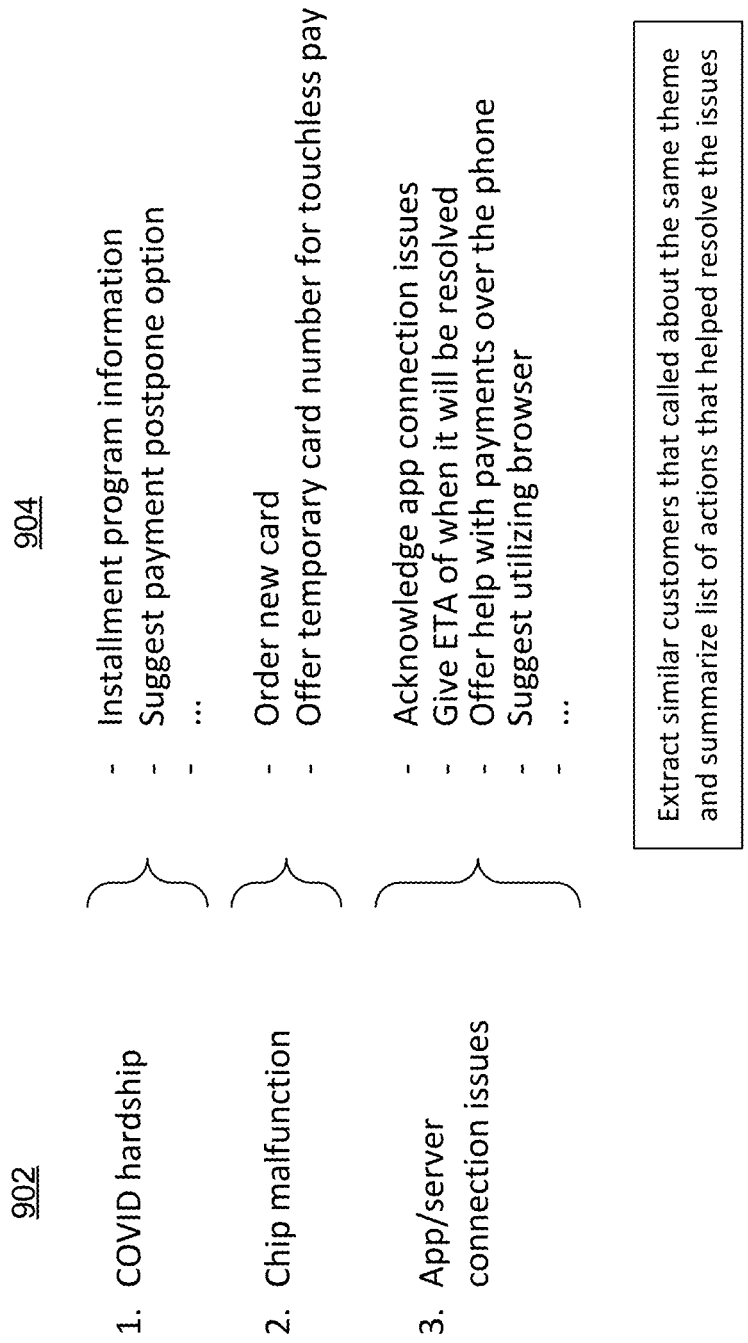
FIG. 9 illustrates a diagram of an example similar caller solution set based on theme detection, as per some embodiments.

FIG. 9 illustrates a call agent assignment based on theme detection, as per some embodiments. As shown, in some embodiments, knowing the trends and topics in a customer service center allows agents to have an idea about what topics will likely be covered in the upcoming calls. This is beneficial for agents to prepare for their calls ahead of time and will result with higher customer experience. These topics are passed to each call agent along with similar customers and actions that helped them. This can help agents choose from the successful actions that were useful to similar customers for a given topic and increase the overall satisfaction.

In a non-limiting example, a hypothetical top 3 most discussed themes in the call center at a given time is shown in column 902 as 1. COVID hardship, 2. Chip malfunction and 3. APP/Server connection issues. Column 904 contains a list of actions that resolved customers who were similar to the current customer and called on the same theme. This support module not only helps agents predict what the next calls will be about but also provides them with a suite of resolutions that are known to work for similar customers which at the end will enable more effective calls.

Figure 10:
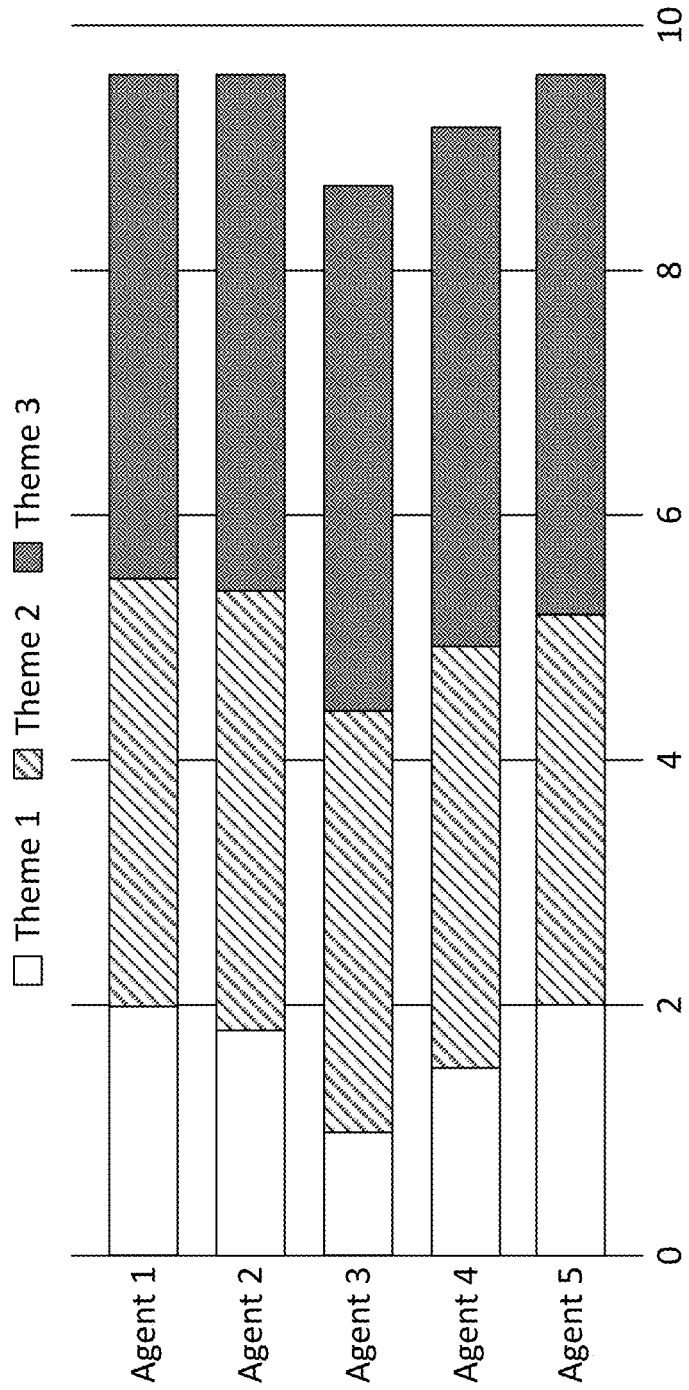
FIG. 10 illustrates a diagram of customer satisfaction for themes and agents, as per some embodiments.

FIG. 10 illustrates a call agent assignment based on theme detection, as per some embodiments. Having a fully trained call center for every call is the ideal goal for achieving the highest customer experience, but it is often not possible as the number of agents are limited, calls are getting higher every day and there are so many topics to be covered. Accordingly, in some embodiments, the technology described herein implements themes to determine strategies related to customer call centers. Once the themes that are most talked about are known, as well as the number of calls for each theme, that information can be used to determine how many agents are needed to cover each topic and call routing can then help route customers to the agents for each area. For themes that have a lot of calls coming in, more agents can be allocated whereas for themes that are not very prominent, fewer agents should be sufficient.

In addition, coaching is important for providing the best experience to customers when they call the customer service centers. Coaching entails equipping agents with the best tools, most useful knowledge and actions that can be taken in different situations. As shown in FIG. 10, coaching opportunities can be seen from an aggregated view of customer satisfaction for each theme from an individual agent's perspective. For example, a customer satisfaction for Theme 1 is significantly lower than scores of Theme 2 and Theme 3. Therefore, it is an indication that some training can be provided to agents on Theme 1 and support on how to resolve issues that are related to that theme. Similarly, the customer satisfaction scores for Theme 3 is quite high and therefore the training time in that area can be lessened.

Figure 11:
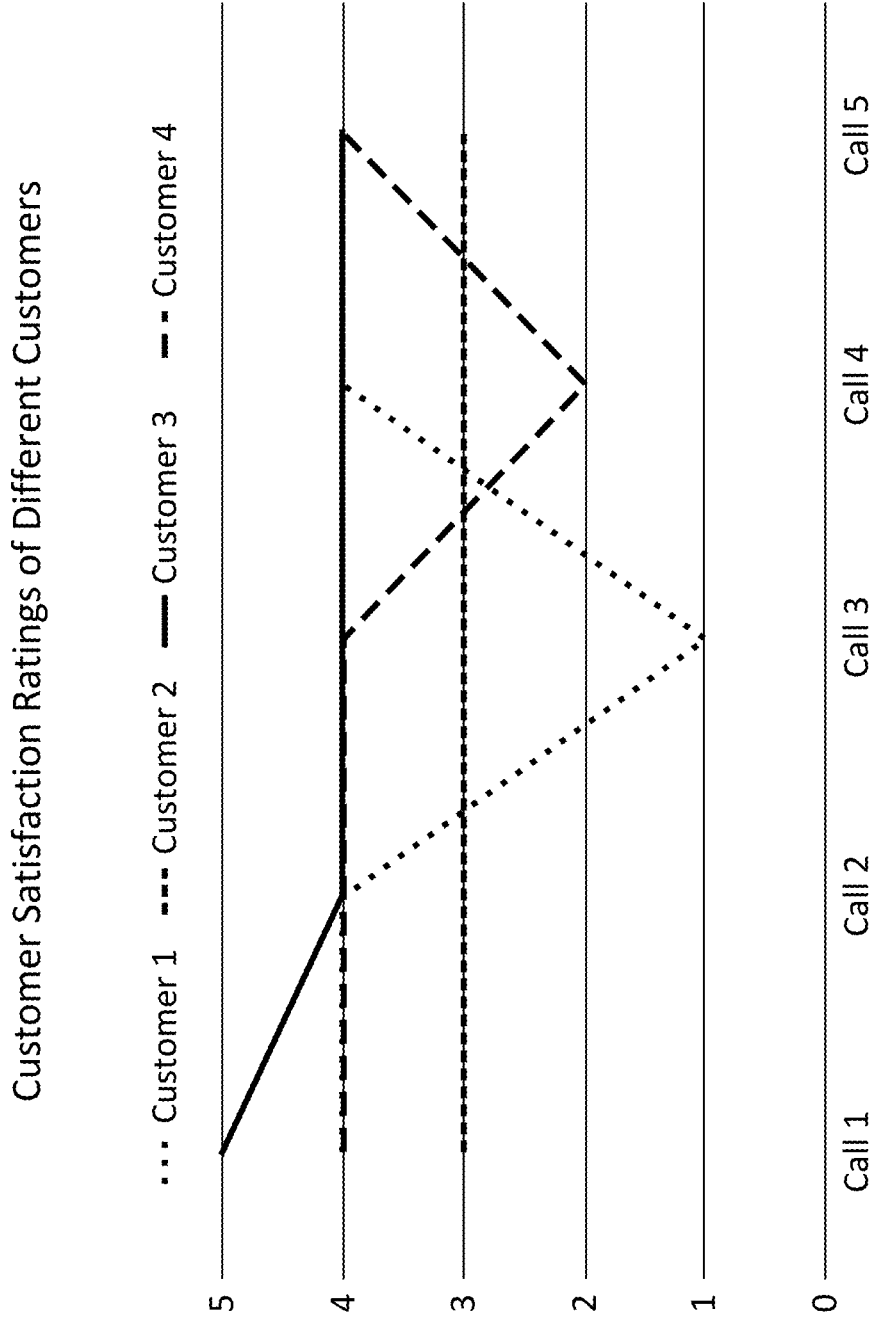
FIG. 11 illustrates a diagram of customer satisfaction ratings for different customers, as per some embodiments.

FIG. 11 illustrates customer satisfaction ratings of different customers, as per some embodiments. As shown from a call agents' perspective, for this particular call agent, the satisfaction scores were lower for Call 3 and Call 4. By exploring what the themes were for Call 3 and Call 4, then comparing these themes to that of Call 1, the system can provide insights about which topics the agent is more effective at providing solutions for. For the themes that the agent is not as effective, managers can provide further support.

Figure 12:
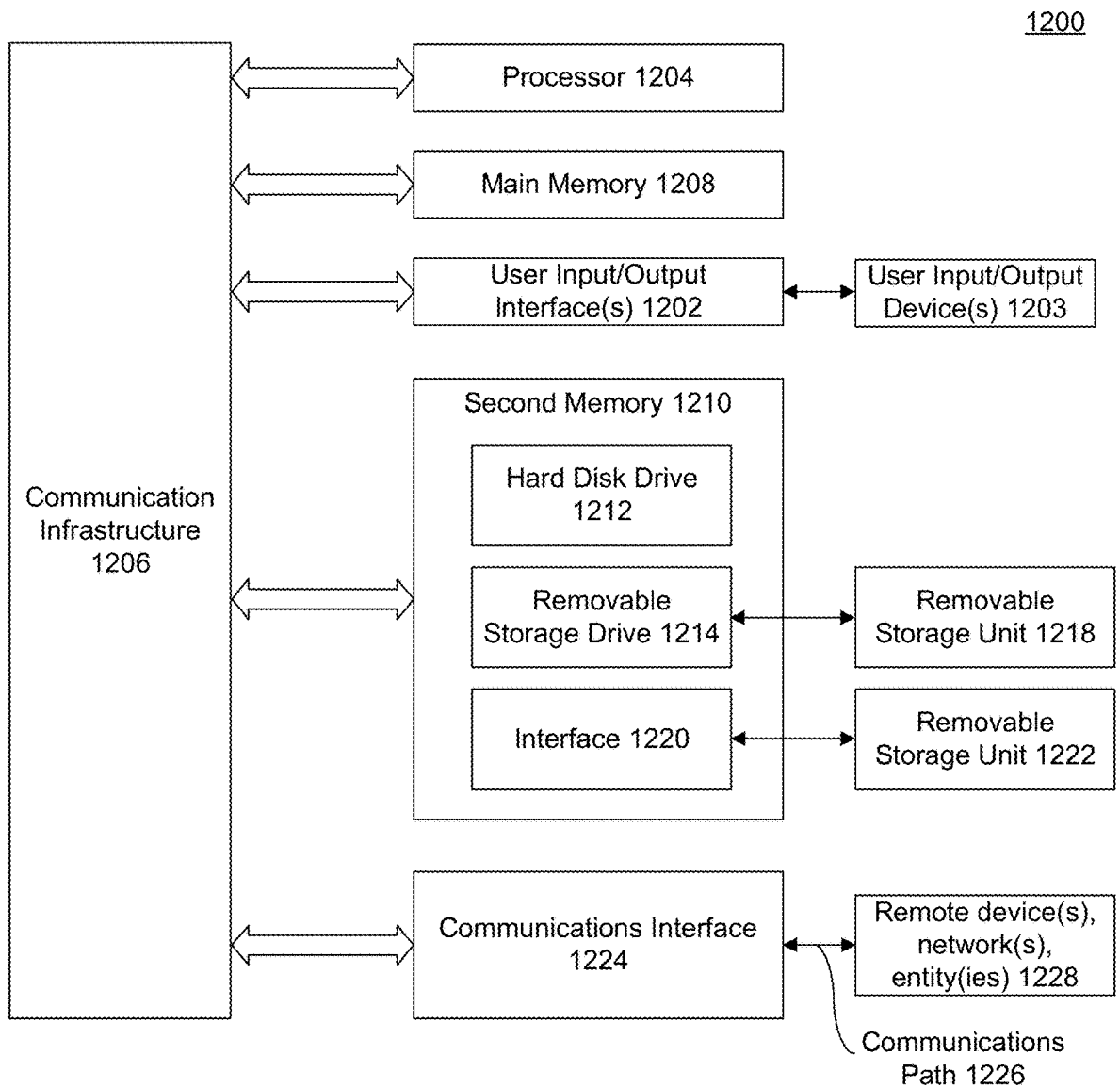
FIG. 12 is an example computer system useful for implementing various embodiments.

Various embodiments can be implemented, for example, using one or more computer systems, such as computer system 1200 shown in FIG. 12. For example, computer system 1200 can identify topics and keywords and phrases in call center calls. Computer system 1200 can be any computer capable of performing the functions described herein. Computer system 1200 can be any well-known computer capable of performing the functions described herein.

Computer system 1200 includes one or more processors (also called central processing units, or CPUs), such as a processor 1204. Processor 1204 is connected to a communication infrastructure or bus 1206.

One or more processors 1204 may each be a graphics-processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1203, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired, and/or wireless, and which may include any combination of LANs, WANs, the Internet, etc. Control logic and/or data may be transmitted to and from computer system 1200 via communication path 1226.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system comprising:
   a memory; and
   at least one processor coupled to the memory and configured to:
   receive an interactive communication;
   infer, from the interactive communication and based on a trained machine learning model, a topic associated with the interactive communication;
   extract, from the interactive communication, keywords associated with the topic;
   rank the keywords, based on a frequency of occurrence within the interactive communication;
   select the N highest ranked keywords from the interactive communication;
   compare the N highest ranked keywords to a database of previously extracted N highest ranked keywords, occurring over a given time period, to identify new keywords;
   label, based on the comparison, the topic as an emerging topic that has been articulated in the interactive communication; and
   suggest, based on previously successful interactive communication outcomes with the emerging topic, one or more phrases to a call center call agent for use in a dialog of a new interactive communication.

2. The system of claim 1, wherein the trained machine learning model comprises a Latent Dirichlet Allocation (LDA) model comparing different instances of the keywords over time.

3. The system of claim 1, wherein the trained machine learning model comprises a clustering model.

4. The system of claim 1, wherein the at least one processor is further configured to:
   identify the keywords based on natural language processing of the interactive communication.

5. The system of claim 1, further comprising an automated call center assistance system to receive the one or more phrases.

6. The system of claim 5, wherein the keywords are configured as key phrases.

7. The system of claim 5, wherein the automated call center assistance system, based on the emerging topic, is configured to:
   route incoming interactive communications to one or more call agents associated with the emerging topic.

8. The system of claim 5, wherein the automated call center assistance system, based on the emerging topic, is configured to:
   alert personnel of a call center to join a current one of the interactive communications or to provide additional assistance.

9. The system of claim 5, wherein the automated call center assistance system is configured to:
   provide to call center personnel subject matter training based on the emerging topic.

10. The system of claim 5, wherein the keywords are recognized by semantic use within the interactive communication.

11. The system of claim 5, wherein the automated call center assistance system is configured to:
    schedule one or more call center personnel based on the emerging topic.

12. The system of claim 11, wherein the scheduling of call center personnel is further based on a frequency of occurrence of the emerging topic in a plurality of the interactive communications.

13. A computer implemented method for processing an interactive communication, the method comprising:
    inferring, by a trained machine learning model, a topic from a plurality of interactive communications;
    extracting, from the plurality of interactive communications, keywords associated with the topic;
    ranking the keywords, based on a frequency of occurrence within the plurality of interactive communications;
    selecting the N highest ranked keywords from the plurality of interactive communications;
    comparing the N highest ranked keywords to a database of previously extracted N highest ranked keywords, occurring over a given time period, to identify new keywords;
    labeling, based on the comparison, the topic as an emerging topic that has been articulated in the interactive communication; and
    suggesting, based on previously successful interactive communication outcomes with the emerging topic, one or more phrases to a call center call agent for use in a dialog of a new interactive communication.

14. The computer implemented method of claim 13 further comprising:
    comparing the keywords over time, where the trained machine learning model comprises a Latent Dirichlet Allocation (LDA) model.

15. The computer implemented method of claim 13, further comprising the keywords configured as key phrases.

16. The computer implemented method of claim 13, further comprising:
    routing incoming interactive communications to call agents associated with the emerging topic.

17. The computer implemented method of claim 13, wherein the trained machine learning model comprises a clustering model.

18. The computer implemented method of claim 13, wherein the keywords are recognized by semantic use within the interactive communication.

19. The computer implemented method of claim 13, further comprising:
    scheduling call center personnel based on the emerging topic and a frequency of occurrence of the emerging topic in the plurality of interactive communications.

20. A non-transitory computer-readable device having instructions stored thereon that, when executed by at least one computing device, cause the at least one computing device to perform operations comprising:
    inferring, by a trained machine learning topic detection model, a topic associated with a plurality of interactive communications;
    extracting, from the plurality of interactive communications, keywords associated with the topic;
    ranking the keywords, based on a frequency of occurrence within the plurality of interactive communications;
    selecting the N highest ranked keywords from the plurality of interactive communications;
    comparing the N highest ranked keywords to a database of previously extracted N highest ranked keywords, occurring over a given time period, to identify new keywords;
    labeling, based on the comparison, the topic as an emerging topic that has been articulated in the interactive communication; and suggesting, based on previously successful interactive communication outcomes with the emerging topic, one or more phrases to a call center call agent for use in a dialog of a new interactive communication.

* * * * *